United States Patent
Schneider

(10) Patent No.: US 7,858,203 B2
(45) Date of Patent: *Dec. 28, 2010

(54) FURAN POLYMER IMPREGNATED WOOD

(75) Inventor: Marc H Schneider, Fredericton (CA)

(73) Assignee: Kebony ASA, Oslo (NO)

( * ) Notice: Subject to any disclaimer, the term of this patent is extended or adjusted under 35 U.S.C. 154(b) by 618 days.

This patent is subject to a terminal disclaimer.

(21) Appl. No.: 10/522,165

(22) PCT Filed: Jul. 21, 2003

(86) PCT No.: PCT/NO03/00251

§ 371 (c)(1),
(2), (4) Date: Nov. 24, 2005

(87) PCT Pub. No.: WO2004/011214

PCT Pub. Date: Feb. 5, 2004

(65) Prior Publication Data

US 2006/0292366 A1    Dec. 28, 2006

(30) Foreign Application Priority Data

Jul. 26, 2002    (NO)    .................................. 20023592

(51) Int. Cl.
*B32B 5/66* (2006.01)
(52) U.S. Cl. ........................ 428/532; 428/535; 428/536; 428/537.1; 427/440; 252/399; 252/388
(58) Field of Classification Search ................ 428/532, 428/535, 536, 537.1; 427/440; 252/399
See application file for complete search history.

(56) References Cited

U.S. PATENT DOCUMENTS 2,909,450 A * 10/1959 Goldstein .................... 427/244

FOREIGN PATENT DOCUMENTS

| JP | HEI 05-31705 | 2/1993 |
| NO | 313183 | 4/2002 |
| NO | 313273 | 8/2002 |
| WO | WO 02/30638 | 4/2002 |
| WO | WO 02/060660 | 8/2002 |

OTHER PUBLICATIONS

Philippou et al, 1982 a : Bonding of particleboard using hydrogen peroxide, lingosulfonates and furfuryl alcohol. Forest Prod. J.32 (5): 55-61.*
Philippou, et al, "Bonding of particle board using hydrogen peroxide, lignosulfates and furfuryl alcohol . . . ", Forest Prod. J., 32(5):55-61, 1982.
Office Action of Sep. 26, 2007 in U.S. Appl. No. 11/304,722.
Office Action of Feb. 4, 2009 in U.S. Appl. No. 11/304,722 (as mentioned to the examiner in the recent amendment in this matter of Mar. 16, 2009).
JP Patent Office, Office Action dated May 7, 2009.

* cited by examiner

*Primary Examiner*—Leszek Kiliman
(74) *Attorney, Agent, or Firm*—Christian D. Abel

(57) ABSTRACT

A furan polymer impregnated wood which comprises wood impregnated with a polymerizable furfuryl alcohol monomer mixture containing at least water and furfuryl alcohol, and an initiator selected from the group consisting of anhydrides, acids and combinations thereof is described. For longer storage life, the mixture contains a stabilizer selected from sodium carbonate, sodium bicarbonate, sodium citrate, phosphates and water-soluble lignin derivatives such as calcium and ammonium salts of lignosulfonic acids, and combinations thereof. A method for preparing a furan impregnated wood and uses thereof is also described.

18 Claims, No Drawings

FURAN POLYMER IMPREGNATED WOOD

The invention described herein relates to a furan polymer impregnated wood which is uniform in colour and density throughout the treated zone. In order to obtain the polymer impregnated wood, a parent wood has been impregnated with a polymerizable furfuryl alcohol monomer mixture containing at least water, furfuryl alcohol, a stabilizer and at least one initiator. The invention also relates to a method for preparing a furan impregnated wood and uses thereof.

Furfuryl alcohol polymerizes (resinifies) in acid media. The acid initiates the polymerization reaction. Strong acids cause violent polymerization of limited usefulness because of the violence. But using weak acids, such as organic acids, the polymerization reaction can be controlled. When it is desired to use furfuryl alcohol as an impregnant for porous materials like wood, it has been found that it is important to select a weak acid that does not separate from the furfuryl alcohol as it moves into the porous media. Having a weak acid that has chemical affinity with the wood is also useful. The non-separating mixture with enhanced affinity for wood is the basis of WO 02/30638 (Marc Schneider).

For some uses, it is desirable to impregnate porous materials like wood with less initiated furfuryl alcohol than in WO 02/30638. It has been found that lower concentrations of furfuryl alcohol polymer (also named furan polymer or furan resin) in the wood still provide useful properties at lower cost and less change in appearance. Wood prepared according to WO 02/30638 is very dark coloured. With lower concentrations, colours from light tan to dark brown are possible.

A method of controlling the concentration of furan polymer in the porous material is to use a liquid carrier for the initiate furfuryl alcohol. The carrier and furfuryl alcohol are impregnated into the porous material together. The carrier is removed from the porous material after impregnation, leaving the initiated furfuryl alcohol in place within the porous material. Polymerization of the initiated furfuryl alcohol can occur before, during or after extraction of the inert carrier. Wood and wood materials are the principle objects of this invention, but other porous materials like brick, Portland cement concrete and stone could be similarly impregnated.

Water is an environmentally friendly, inexpensive compound. Furfuryl alcohol is soluble in water, so water can be used as a carrier for diluted, uninitiated furfuryl alcohol but it will not polymerize usefully.

When an organic acid initiator is mixed with furfuryl alcohol, an ester is formed. That ester has limited solubility in water. A two-phase mixture occurs. Upon agitation, an emulsion is formed. In early work with this mixture, it was assumed that the emulsion would not penetrate wood well, so experiments were conducted exploring ways to cause the mixture to become a single phase. Those experiments showed that adding certain chemicals produced a stabilized, single phase mixture with the catalyzed furfuryl alcohol and water which is the basis of WO 02/060660. The first useful chemicals stabilizers discovered were borax and sodium salts of lignosulfonic acids.

Furfuryl alcohol containing an organic acid initiator and then mixed with water, without stabilizer, will slowly polymerize. That slow polymerization reaction produces acid, which accelerates the polymerization. This process limits the useful lifetime of the mixture. Further work with these mixtures indicated that a main function of the stabilizers was to cause the acidity of the mixture to remain stable rather than increasing, thus extending the useful lifetime of the mixture. This further work also indicated that there are a great many chemicals that can act as stabilizers. Borax and sodium salts of lignosulfonic acids that were first used are only examples of this larger number of possibilities.

The further work impregnated wood with an emulsion of initiated furfuryl alcohol in water containing no stabilizers. The concentration was 1% maleic anhydride and 12% furfuryl alcohol based on water. After vigorous mixing, a cloudy mixture was formed that impregnated wood well, and after heating, polymerized within the wood. Other concentrations also made workable mixtures. Therefore for certain uses and processes with wood, it is not necessary to use stabilizers in an initiated furfuryl alcohol mixture in water.

The further work found that the sequence of mixing initiator, furfuryl alcohol and water is not important. The same two phase mixture occurred whether the initiator was added to the water followed by the furfuryl alcohol, or the furfuryl alcohol was added to the water followed by the initiator.

In making a stabilized mixture, it was found that pH values were important. A particular pH range for the mixed solution would give long storage life and would also become sufficiently more acid during heating to cause polymerization. In making the stabilized mixture, however, sequence of mixing can be important. Furfuryl alcohol can vary in acidity by batch and storage time and storage conditions. So mixing furfuryl alcohol with water first and then adding correct amounts of acidic initiator and buffering stabilizer to a target pH is a good way of getting uniform, stable treating mixtures.

Useful initiated furfuryl alcohol emulsions in water without buffering stabilizers typically had a pH near 2.3 which lowered to 1.4 when heated for curing.

Stabilizers maintained the pH of useful treating mixtures until after the wood was impregnated. Then the pH decreased (became more acid) which facilitated curing. The stabilized mixtures that stored well typically had pH values between 3.5 and 4.0. Upon heating to cause polymerization, the pH decreased to the 2.5 to 2.8 range.

One object of the invention is to provide a furan polymer impregnated wood by altering the wood cell wall with the same chemical monomer as that disclosed in WO 02/30638 but using smaller amounts of chemical.

Another object of the invention is to provide a uniform distribution of the chemicals in the furan polymer impregnated wood by using water as an environmentally-friendly and production-friendly diluent giving uniform, controllable, low retention of active chemical in the treated zone of the wood.

Still another object of the invention is to provide a furan polymer impregnated wood having improved properties such as dimensional stability, decay and weather resistance.

According to the present invention, the foregoing and other objects are attained by a product, method and uses thereof as disclosed in the patent claims.

In one embodiment of this invention, there is provided a furan polymer impregnated wood which is obtained by wood impregnated with a polymerizable furfuryl alcohol monomer mixture containing at least water, furfuryl alcohol, a stabilizer selected from water-soluble lignin derivatives, and combinations thereof, and an initiator, characterized by the use of a stabilizer further selected from sodium carbonate, sodium bicarbonate, sodium citrate, phosphates and water-soluble lignin derivatives such as calcium and ammonium salts of lignosulfonic acids, and an initiator selected from maleic anhydride, phthalic anhydride, maleic acid, malic acid, phthalic acid, benzoic acid, malonic acid, ascorbic acid, boric acid, citric acid, zinc chloride, aluminum chloride, other cyclic organic anhydrides and acids, and combinations thereof.

In order to obtain reasonable shelf life and optimal polymerizable conditions, pH of said furfuryl alcohol mixture is from 2.5 to 4.0.

It is noted that said stabilizer can be used alone or in combination with at least another stabilizer. The same applies for said initiator.

In another embodiment of this invention, there is provided a method for preparing a furan polymer impregnated wood which is obtained by wood impregnated with a polymerizable furfuryl alcohol monomer mixture containing at least water, furfuryl alcohol, a stabilizer selected from water-soluble lignin derivatives, and combinations thereof, and an initiator, characterized by the use of a stabilizer further selected from sodium carbonate, sodium bicarbonate, sodium citrate, phosphates and water-soluble lignin derivatives such as calcium and ammonium salts of lignosulfonic acids, and an initiator selected from maleic anhydride, phthalic anhydride, maleic acid, malic acid, phthalic acid, benzoic acid, malonic acid, ascorbic acid, boric acid, citric acid, zinc chloride, aluminum chloride, other cyclic organic anhydrides and acids, and combinations thereof, followed by a curing step.

Any use of the furan polymer impregnated wood can be provided. However, use as building parts (fascia, cornice, siding, sills, frames, millwork), boat parts (frames, planking, decks), marine items (docks, piers, lobster traps, weir poles), outdoor items (furniture, decks, railings and stairs, walkways, boardwalks, playground equipment), bridge parts (beams, railings, decking), railway sleepers, cooling tower slats, utility poles, heavy timbers, fenceposts, stakes, highway items (guard rail posts, guard rail plates, sign posts, light poles), flooring and containers (tanks, buckets) is preferred.

Two keys to the invention are 1) the use of water as a diluent for catalyzed furfuryl alcohol monomer and 2) the use of stabilizers which allows the initiated monomer to be water soluble and remain stable in storage.

If 1) alone is mixed, an emulsion with limited shelf life results. This emulsion can be impregnated into wood and cured there if used within a few days. If stored longer, the catalyzed furfuryl alcohol polymerizes sufficiently to make the mixture not useful for impregnating wood. Using 2) gives a mixture which is stable in storage for several months.

The initiators have similar affinity for wood as furfuryl alcohol and are chemically bound to the furfuryl alcohol and therefore enter the wood and remain in solution as deeply as it penetrates. Wherever the solution penetrates, it is polymerizable. The initiators are selected from any water-soluble, organic, anhydride-containing compound as well as acids including maleic acid, malic acid, phthalic acid, citric acid and benzoic acid. However, preferably a compound selected from maleic anhydride, phthalic anhydride and a combination thereof can be used, more preferably maleic or phthalic anhydride only. The stabilizer can in addition to those mentioned above also include borax and sodium salts of lignosulfonic acids. To make a treating mixture with long-term stability under 2), at least one of the initiators, preferably one of these initiators only, and one or two of the stabilizers are dissolved in water. Furfuryl alcohol is then added, forming a mixture which has several months useful life at room temperature. Alternatively, furfuryl alcohol can be dissolved in water and then the stabilizer(s) and initiator added.

If limited surface impregnation or end-grain penetration is needed, brushing, rolling, spraying or soaking using the impregnating mixture can be used.

For easily impregnable woods, when deep penetration is not needed, vacuum only may be used. For deep and uniform penetration, there are three options: a) pressure alone (1 to 10 bar), b) vacuum followed by pressure (full cell process), c) atmospheric or low (1 bar) pressure followed by pressure and then final vacuum (empty-cell process).

For difficult-to-penetrate woods like spruce, an oscillating pressure method may be used.

Times required for all of these processes depend upon many factors, including capability of equipment, size of wood, species of wood and penetration desired.

The impregnation method generally used (full cell process) in accordance with the present invention is as follows:
i) loading vessel with wood and securing the load so it will not float
ii) closing door and drawing an appropriate partial vacuum,
iii) filling the vessel with the treating mixture, while maintaining vacuum,
iv) pressurizing the submerged wood to a pressure in the range of 5 to 10 bar (75 to 150 psi) depending on wood species and other factors,
v) after sufficient time under pressure, reducing pressure to 2 or 3 bar, and expelling the treating fluid with remaining pressure,
vi) releasing all pressure, opening door and removing treated wood to curing area.

Wood moisture content must be below fiber saturation point (about 30% MC) in the zone to be treated. The lower the moisture content, the more chemical that can be impregnated. If a specific target amount of chemical is required, the moisture content of the wood and the amount of mixture impregnated must be taken into account and the concentration of the treating chemical adjusted accordingly.

The following examples are presented in further illustration of the invention and are not to be construed as limiting the scope of the invention.

Concentrations of treating mixtures we have successfully tried include, based on weight of water:

| Stabilizer(s) | % stabilizer(s) | % initiator (maleic anhydride) | % furfuryl alcohol |
| --- | --- | --- | --- |
| Borax + lignin | 8.5 | 2.3 | 30 |
| Borax + lignin | 5.5 | 3 | 12 |
| Borax + lignin | 5.5 | 2 | 8 |
| Borax + lignin | 5.5 | 2 | 16 |
| Borax + lignin | 5.5 | 2 | 24 |
| Borax + lignin | 5.5 | 2 | 32 |
| Borax + lignin | 5.5 | 2 | 40 |
| Lignin | 3 | 0.5 | 12 |
| Sodium bicarbonate + lignin | 4 | 2 | 12 |
| Sodium bicarbonate + lignin | 4.75 | 2 | 12 |
| Sodium bicarbonate + lignin | 4 | 1.8 | 12 |
| Sodium carbonate | 0.2 | 0.4 | 12 |
| Sodium carbonate | 0.5 | 1 | 12 |
| Sodium carbonate | 1 | 2 | 12 |
| Sodium carbonate | 1.75 | 3.5 | 12 |

All other concentrations of furfuryl alcohol in water (from about 5% to nearly 100% based on solution) with proportional amounts of initiator and buffer can be used, depending on the desired product polymer loading and material properties.

Below about 5% there is too little polymer formed in the wood to change properties usefully, and approaching 100% the properties become very close to WO 02/30638. However, low concentrations may be useful for fixing normally leachable preservatives, such as those based on boron and copper.

The mixing operation is usually started by heating the water to approximately 40° C. which facilitates the addition of maleic or phthalic anhydride and stabilizer(s) (if stabilizers are used). When these solid additives are fully dissolved in the water, the solution is cooled to 20° C. to 25° C. and then the furfuryl alcohol is blended in with stirring, and is stored at a temperature of 15° C. to 20° C. Alternatively, furfuryl alcohol can be added to water and the other ingredients added next. However, this cannot practically be carried out at elevated temperature because polymerization can occur in the mixture. Therefore, this method requires a longer time for dissolution of solid components because it must be carried out at room temperature or cooler.

The curing can take place at a range of temperatures, starting at from about 25° C. to about 140° C. The lower temperatures (below about 40° C.) require a long time to cure (days or weeks). From about 70° C. to about 100° C. the curing time is hours. Above 100° C. curing times are even shorter but usually moisture conditions must be controlled because otherwise rapid drying can occur causing checking and cracking of the wood.

In accordance with the present invention, steam or hot, humid air curing in the temperature range of about 70° C. to 100° C. works well at a fixed temperature within the range. Also, temperature can be increased as curing and drying proceeds. Essentially, this is conventional temperature kiln drying. Curing and drying in hot oil also works well at temperatures from 70° C. to 120° C., either a fixed temperature within the range or by increasing temperature within the range as curing and drying proceeds. Curing and drying in controlled humidity with fixed or increasing temperature in the 100° C. to 120° C. range works well. Essentially, this is high-temperature kiln drying. The furfuryl alcohol will cure readily in these temperatures with the furfuryl initiator to alcohol ratio used. Material 10 mm to 20 mm thick will cure in two or three hours, but drying to final moisture content takes longer.

The starting material is a woody material, usually lumber, which includes plank (thick lumber), but can also be wood composites such as oriented strand board and particleboard. Woody materials of any dimensions can be utilized.

The length of the woody materials is important to treating times and impregnation uniformity since the treating mixture travels very quickly along the length but very slowly across the grain (perpendicular to the tree axis). With permeable woods like beech and birch, the uniformity of treatment is determined by how well the treating mixture remains uniform as it travels along the length, and moves from pores to fibers. When impregnation of permeable wood is complete, the woody material formed by this method has uniform properties throughout. Colour, mechanical properties and resistance to moisture, weathering and deterioration are consistent throughout. Different species of wood, and even different boards of the same species, may impregnate differently because of differences in permeability. This is inherent in the nature of wood. With woods of low permeability, impregnation along the grain is slow and the across-the-grain direction may be the major path for impregnation. In that case, the treating mixture, and resulting properties, remain uniform as deeply as the mixture penetrates.

Woody material, including cheap types and scrap material, can be used to produce noble wood products such as imitation teak, mahogany, and others, and also provide them with novel properties like water and weather resistance and simpler and reduced maintenance requirements.

Various initiator and stabilizer types and amounts were tried attempting to obtain combinations that would result in a water-soluble, curable mixture with a useful shelf life. After many trials, several things became apparent:

1. Maleic anhydride was the best polymerization initiator tried. It is also a desirable component because it is thought to act as a bonding agent to wood.
2. Stabilizers helped to keep the mixture uniform for longer time. Otherwise, it separated into components and one partially settled to the bottom. To make the mixture useful without stabilizers, strong shaking to form an emulsion was needed. That emulsion had a limited lifetime before polymerization rendered it useless for impregnation.
3. The mixture with stabilizer(s) required the pH to be within a mildly acidic range to form a uniform, stable mixture which later could be polymerized within the wood.
4. The pH became lower (more acid) when the mixture was heated, causing curing.

Surfactants (soaps and detergents) and buffers were tried as stabilizers. Borax (sodium tetraborate decahydrate) made homogeneous mixtures that penetrated wood well. Mixtures containing 30% furfuryl alcohol and borax were found to be still useful after a more than a year of storage at room temperature. Further work determined that other stabilizers, such as washing soda (sodium carbonate) and baking soda (sodium bicarbonate) also work well. These stabilizers maintain the treating mixture at steady pH (they buffer it) until after the wood is impregnated. Then the pH dropped (became more acid) which caused polymerization. The buffered mixtures that stored well typically had a pH between 3.5 and 4.0. Upon heating in the curing process, the pH decreased to the 2.5 to 2.8 range and polymerization occurred. The sodium bicarbonate buffered mixtures have shown good shelf life. Sodium carbonate buffer also yields workable mixtures, at even lower concentrations than either borax or sodium bicarbonate. Lignin derivatives were also found to act alone as stabilizers. However, lignin usually causes impregnation to be less uniform.

Catalyzed emulsions without buffering stabilizers typically were formulated to have a pH near 2.3 which lowered to about 1.4 when heated for curing.

Mixtures of about 8% to 900% concentration of furfuryl alcohol based on water (9% to 90% based on solution) were found to provide moisture and decay protection to the wood, with the higher concentrations performing better. However, the lower concentrations improve properties, making them attractive for uses for which untreated wood deteriorates. These lower concentrations are of especial interest because of their low cost and light colour. But to protect the full concentration range expected to be practical and useful, the following water-based mixture percentage (based on solution) limits are suggested:

| Furfuryl alcohol Lower | Upper | Initiator Lower | Upper | Stabilizer Lower | Upper |
| --- | --- | --- | --- | --- | --- |
| 2 | 90 | 2 | 5 | 0 | 10 |

The invention claimed is:

1. A method for impregnating lumber, comprising submerging a piece of lumber in a polymerizable furfuryl alcohol monomer mixture, said mixture comprising water, furfuryl alcohol, a stabilizer and an initiator, wherein the stabilizer is selected from the group consisting of sodium carbonate, sodium bicarbonate, sodium citrate, phosphates and water-soluble lignin derivatives, and the initiator is selected from the group consisting of maleic anhydride, phthalic anhydride, maleic acid, malic acid, phthalic acid, benzoic acid, malonic acid, ascorbic acid, boric acid, citric acid, zinc chloride, aluminum chloride, and combinations thereof, applying a pressure of 1 bar or more in a pressure step, and curing the piece of wood in a curing step.

2. The method according to claim 1 wherein the stabilizer is selected from the group consisting of sodium carbonate, sodium bicarbonate, sodium citrate and phosphates.

3. The method according to claim 1 wherein the stabilizer is selected from the group consisting of sodium carbonate, sodium bicarbonate and sodium citrate.

4. The method according to claim 1 wherein the stabilizer is sodium carbonate or sodium bicarbonate.

5. The method according to claim 1 wherein the stabilizer is sodium bicarbonate.

6. The method according to claim 1, wherein the concentrations of the furfuryl alcohol, stabilizer and initiator, based on weight of water, are 2-90%, greater than zero −10%, and 0.4-5% respectively.

7. The method according to claim 6, wherein the concentrations of stabilizer and initiator are 0.2-4.75% and 0.4-3.5% respectively.

8. The method according to claim 1 further comprising a vacuum step.

9. The method according to any one of claims 1-8, wherein the initiator is maleic anhydride.

10. The method according to any one of claim 6 or 7 wherein the pH of the mixture is from 3.5 to 4.

11. A method of impregnating wood in a full cell process, comprising the steps of:
   i) loading an impregnation vessel with wood and securing the wood so it will not float
   ii) closing the vessel and drawing a partial vacuum,
   iii) filling the vessel with a treating mixture, while maintaining vacuum, said treating mixture comprising water, furfuryl alcohol, a stabilizer and an initiator, wherein the stabilizer is selected from the group consisting of sodium carbonate, sodium bicarbonate, sodium citrate, phosphates and water-soluble lignin derivatives, and the initiator is selected from the group consisting of maleic anhydride, phthalic anhydride, maleic acid, malic acid, phthalic acid, benzoic acid, malonic acid, ascorbic acid, boric acid, citric acid, zinc chloride, aluminum chloride, and combinations thereof,
   iv) pressurizing the submerged wood to a pressure in the range of 5 to 10 bar,
   v) reducing pressure to 2 or 3 bar, and expelling the treating fluid with remaining pressure,
   vi) releasing all pressure, opening door and removing treated wood.

12. A formulation for impregnating wood, comprising water, furfuryl alcohol, a stabilizer and an initiator, wherein the stabilizer is selected from the group consisting of sodium carbonate, sodium bicarbonate, sodium citrate and phosphates, and the initiator is selected from the group consisting of maleic anhydride, phthalic anhydride, maleic acid, malic acid, phthalic acid, benzoic acid, malonic acid, ascorbic acid, boric acid, citric acid, zinc chloride, aluminum chloride, and combinations thereof.

13. The formulation according to claim 12, wherein the stabilizer is selected from the group consisting of sodium carbonate, sodium bicarbonate and sodium citrate.

14. The formulation according to claim 12, wherein the stabilizer is sodium carbonate or sodium bicarbonate.

15. The formulation according to claim 12, wherein the stabilizer is sodium bicarbonate.

16. The formulation according to claim 12, wherein the concentrations of the furfuryl alcohol, stabilizer and initiator, based on weight of water, are 2-90%, greater than zero −10%, and 0.4-5% respectively.

17. The formulation according to claim 16, wherein the concentrations of stabilizer and initiator are 0.2-4.75% and 0.4-3.5% respectively.

18. The formulation according to any one of claims 12-17, wherein the pH of the mixture is from 3.5 to 4.

* * * * *